P. ERICKSON.
POISONED FOOD CONTAINER.
APPLICATION FILED FEB. 10, 1917.
1,233,332.
Patented July 17, 1917.
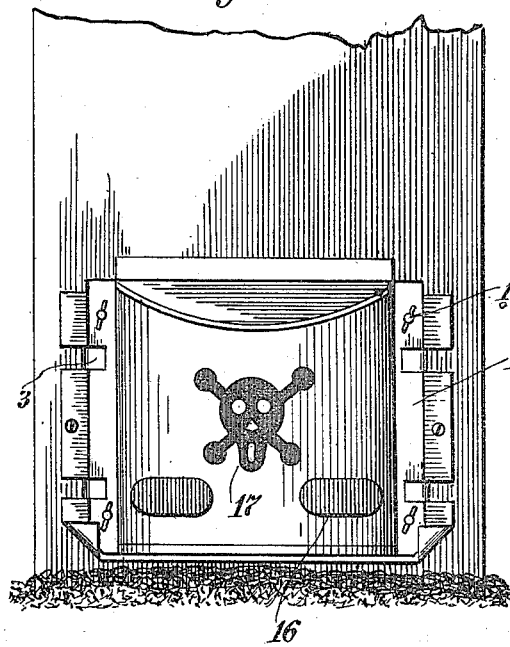
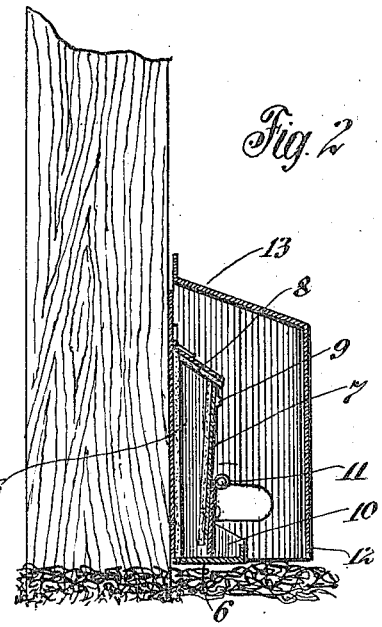
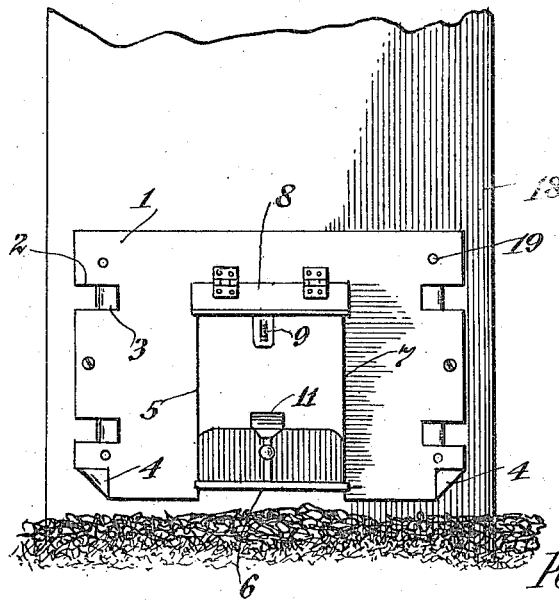
Inventor
Peter Erickson.
Witnesses:
Charles Craig
Karl H. Butler
Attorneys.

UNITED STATES PATENT OFFICE.

PETER ERICKSON, OF WINDSOR, ONTARIO, CANADA.

POISONED-FOOD CONTAINER.

1,233,332.     Specification of Letters Patent.     Patented July 17, 1917.

Application filed February 10, 1917. Serial No. 147,832.

*To all whom it may concern:*

Be it known that I, PETER ERICKSON, a subject of the King of Great Britain, residing at Windsor, in the county of Essex and Province of Ontario, Dominion of Canada, have invented certain new and useful Improvements in Poisoned-Food Containers, of which the following is a specification, reference being had therein to the accompanying drawings.

This invention relates to a poison food container, and the primary object of my invention is to provide a self-feeding container for poison or food that is poisoned, and to shield or inclose the same so certain animals cannot obtain the poisoned food.

Another object of my invention is to provide a poisoned food container that has been especially designed to exterminate gophers, rats, mice and other rodents that are generally found in a field and are destructive to crops, trees, and drainage systems. The exterminating device has a shield or guard which will prevent domestic animals, as cows or birds from obtaining the poisoned food, and provision is made for preventing accidental displacement of the food container by animals.

A further object of this invention is to provide a simple, durable and inexpensive food container that may also be used for properly feeding certain animals by simply removing the shield or guard.

I attain the above and other objects by a mechanical construction that will be hereinafter described and then claimed, and reference will now be had to the drawing, wherein—

Figure 1 is a front elevation of the food container;

Fig. 2 is a vertical sectional view of the same, and

Fig. 3 is a front elevation of the container with the shield or guard removed.

In the drawing, 1 denotes a plate substantially rectangular in elevation and having the side edges thereof slotted or slitted, as at 2, to provide guide lugs 3, said lugs being bent into parallelism with the plate 1 to coöperate therewith in providing guides. The lower edge or corners of the plate 1 has the material thereof bent to provide stops or supports 4, as best shown in Figs. 1 and 3.

Located centrally of the plate 1 is a box-like container 5 including a bottom plate 6, an inclined front wall 7 and a hinged lid 8.

The hinged lid 8 permits of food, particularly poisoned food being placed in the container, and said lid is held in a closed position by a suitable catch or holdfast device generally designated 9. The lid 8, as well as other walls of the container, are lined with pasteboard, asbestos or a material which will exclude moisture or dampness from the contents of the container and prevent packing or solidifying of the contents.

The bottom plate 6 is in spaced relation to the lower edge of the inclined front wall 7 so that food within the container will self-feed on to an extension or trough 10 of the bottom plate 6, and to regulate the supply of food to the trough 10, the inclined front wall 7 has a slide 11 that is frictionally held in engagement with the wall 7 and may be raised or lowered to control the flow or heaping of food in the trough.

Inclosing the container 5 is a semi-cylindrical shield or guard 12 having the bottom thereof open and the top thereof closed by an inclined plate 13. The shield or guard has side flanges 14 that permit of the shield or guard being placed in engagement with the plate 1 and held by the lugs 3 and the stops 4. With the shield or guard slidably engaging the plate 1, it can be easily removed when it is necessary to fill the container 5. To prevent accidental displacement of the shield or guard, set screws 15 or other fastening means may be employed.

To permit of gophers, mice and other rodents obtaining the poisoned contents of the container 5, the shield or guard has small oblong openings 16 adjacent the lower edge thereof, and as a warning to persons unfamiliar with the container, the front side of the shield or guard is provided with suitable indicia 17 to indicate poisonous matter.

In practice, the plate 1 is secured to a post 18 or other support by nails 19 or similar fastening means and it is possible to locate the container very close to the ground, so that gophers, mice or other rodents can easily enter the openings 16 of the shield or guard and obtain the food from the trough 10. Paris green or similar poisonous matter is mixed with a suitable food, as chopped meat or the like and by using a proper poisonous matter, the animals are not immediately killed, but will eventually die outside of the shield or guard. It is impossible for large animals, wild birds and game to obtain the poisoned food and there is sufficient warning on the shield or guard to prevent persons from tampering with the container.

The entire structure may be made of a non-corrodible material or finished so that it will not rust, and while in the drawing there is illustrated a preferred embodiment of my invention, it is to be understood that the structural elements are susceptible to such variations and modifications as fall within the scope of the appended claims.

What I claim is:—

1. A poisoned food container comprising a plate adapted for attachment to a suitable support, a container carried by said plate, a trough forming part of said container and in communication therewith, and a semi-cylindrical shield on said plate and provided with openings, said shield having the top thereof closed and the side edges supported in parallelism with said plate.

2. A poisoned food container comprising a plate adapted for attachment to a suitable support, a container carried by said plate, lugs at the side edges of said plate, a trough in communication with said container adapted to receive the contents thereof, a slide on said container for regulating the passage of the contents of said container to the trough, and a detachable shield having side edges thereof between said plate and the lugs thereof and extending in front of said container and provided with openings.

3. A poisoned food container comprising a plate, a container thereon having an inclined wall and a hinged lid, a trough in communication with said container and adapted to receive the contents thereof, lugs carried by said plate, stops at the bottom of said plate and a curved shield on said plate provided with openings and inclosing said container, said shield having the side edges thereof between said plate and said lugs and resting on said stops.

In testimony whereof I affix my signature in the presence of two witnesses.

PETER ERICKSON.

Witnesses:
ANNA M. DORR,
L. E. FLANDERS.

Copies of this patent may be obtained for five cents each, by addressing the "Commissioner of Patents, Washington, D. C."